(12) United States Patent
Steinmeyer et al.

(10) Patent No.: US 9,753,266 B2
(45) Date of Patent: Sep. 5, 2017

(54) METHOD FOR DETECTING AND CONTROLLING SUPPLY OF AN IMMERSION MEDIUM

(71) Applicant: Carl Zeiss Microscopy GmbH, Jena (DE)

(72) Inventors: Ralf Steinmeyer, Hannover (DE); Reiner Mitzkus, Goettingen (DE); Timo Rojahn, Uslar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 15 days.

(21) Appl. No.: 14/319,246

(22) Filed: Jun. 30, 2014

(65) Prior Publication Data

US 2015/0015942 A1    Jan. 15, 2015

(30) Foreign Application Priority Data

Jul. 11, 2013  (DE) .................. 10 2013 011 543

(51) Int. Cl.
*G02B 7/28* (2006.01)
*G02B 21/24* (2006.01)
*G02B 21/33* (2006.01)

(52) U.S. Cl.
CPC ......... *G02B 21/241* (2013.01); *G02B 21/245* (2013.01); *G02B 21/33* (2013.01); *G02B 21/244* (2013.01)

(58) Field of Classification Search
CPC .. G02B 21/244; G02B 21/245; G02B 21/241; G02B 21/33; G02B 21/42; G02B 1/24;
(Continued)

(56) References Cited

U.S. PATENT DOCUMENTS 7,109,459 B2 * 9/2006 Kam .................. G01N 21/6458
250/201.4
8,199,407 B2 * 6/2012 Liebel .................... G02B 21/24
359/509
(Continued)

FOREIGN PATENT DOCUMENTS

DE    102006027836    12/2007
DE    102006042088    3/2008
(Continued)

OTHER PUBLICATIONS

German Search Report for German Application No. DE 102013011543.4, dated Sep. 3, 2013. English translation provided.
(Continued)

*Primary Examiner* — Stephone B Allen
*Assistant Examiner* — Rahman Abdur
(74) *Attorney, Agent, or Firm* — Patterson Thuente Pedersen, P.A.

(57) ABSTRACT

A method for detecting and controlling supply of an immersion medium into an immersion film region between the front lens of a microscope objective and a preparation, particularly in automated microscopes, using a light source which is reflected into the microscope beam path by means of a beam splitter. The state of the immersion film region is recorded and evaluated in a detection unit of the microscope or a detection unit of the autofocus device through an autofocus signal of the light source and/or a reflection of a modulation object arranged in the intermediate image plane of an incident light illumination, and is transmitted to a control unit for the purpose of a change or an error treatment of the immersion process.

10 Claims, 3 Drawing Sheets

(58) Field of Classification Search
CPC .. G02B 7/36; G02B 7/32; A61F 9/067; H04N 5/23212
USPC ..... 359/368, 383, 390, 362, 363; 250/201.1, 250/201.2, 201.3, 201.4
See application file for complete search history.

(56) References Cited

U.S. PATENT DOCUMENTS

| | | |
|---|---|---|
| 8,643,946 B2 | 2/2014 | Westphal et al. |
| 2005/0179997 A1* | 8/2005 | Komatsu ................ G02B 21/33 359/368 |
| 2010/0033811 A1* | 2/2010 | Westphal ............. G02B 21/244 359/368 |

FOREIGN PATENT DOCUMENTS

| | | |
|---|---|---|
| JP | 2005227098 | 8/2005 |
| JP | 2005227098 A * | 8/2005 |
| JP | 2006194978 | 7/2006 |
| JP | 2007264114 | 10/2007 |
| JP | 2012093387 | 5/2012 |
| WO | WO 2007/144197 | 12/2007 |

OTHER PUBLICATIONS

European Search Report for European Application No. 14171933 dated Nov. 18, 2014. English translation not provided.

* cited by examiner

METHOD FOR DETECTING AND CONTROLLING SUPPLY OF AN IMMERSION MEDIUM

RELATED APPLICATIONS

This application claims the benefit of German National Patent Application No. 102013011543.4, filed on Jul. 11, 2013, said application being hereby fully incorporated herein by reference.

FIELD OF THE INVENTION

The invention relates to a method for detecting and controlling supply of an immersion medium into the immersion film region between the front lens of a microscope objective and a preparation, particularly in automated microscopes, using an autofocus device with a light source which is reflected into the microscope beam path with a beam splitter.

BACKGROUND OF THE INVENTION

In modern microscopy, particularly in the high-end range, many optically high-quality objectives are calculated and designed such that they only operate optimally if the gap between the front lens of an objective and the preparation to be observed is filled with a so-called immersion medium. Due to its optical properties which resemble those of glass more than those of air, this immersion medium has the purpose of providing improved optical properties during imaging. However, with a microscope with incubation means or other attachment parts placed in the surroundings of the object, the manual application of this immersion medium is very elaborate. In addition, it is very difficult for the operator to evaluate the condition of the immersion since, as a rule, it is very difficult or impossible to examine. In fact, access or control in automated microscopes may be entirely impossible since the entire microscope is enclosed in a housing.

DE 102006042088 B4 describes a device and a method for forming an immersion film between a lens of a microscope objective and a sample carrier with an element attached to the objective which defines the immersion film region. With a sensor unit, the state of the immersion film in the immersion film region is detected. The supply of the immersion is controlled on the basis of the state of the immersion film. This solution is disadvantageous because the sensor unit attached to the objective has a negative impact on the structure of the microscope.

Furthermore, JP 2012093387 A2 describes a microscope system in which the immersion fluid is detected by evaluating the focal coordinate. This takes advantage of the fact that the focal coordinate moves if the immersion fluid is compromised, since the focal point of the microscope objective shifts without an immersion fluid. Determining the focus displacement with this solution, however, is very complicated.

Proceeding from the solutions of the prior art, the invention addresses the problem of further developing a method for detecting and controlling supply of an immersion medium such that, without additional hardware components specifically developed for such purpose, independently from the ambient parameters such as filling level of the system or point of time of the last immersion, the supply of the immersion fluid can be controlled such that the required amount is always available in the immersion film region.

SUMMARY OF THE INVENTION

According to embodiments of the invention, the aforementioned problem is solved by a method of the initially described type using an autofocus device for the microscopy according to WO 2007/144197 A1 with a method according to claim 1. Other advantageous features of the method are contained in the dependent claims.

According to an embodiment of the invention, the state of the immersion film region is recorded and evaluated in a detection unit of the microscope or a detection unit of the autofocus device with an autofocus signal of the light source and/or a reflection of a modulation object arranged in the intermediate image plane of an incident light illumination and transmitted to a control unit for the purpose of a change or an error treatment of the immersion process.

In an embodiment, the following method steps can be performed:

Automatically focusing without immersion medium between the front lens and a preparation on the bottom of a preparation carrier;

Recording the autofocus signal as back reflection from an autofocus device and/or recording the reflection of the modulation object arranged in the intermediate image plane of the incident light illumination with one of the detection units;

Adjusting the autofocus signal and/or the reflection from the modulation object to the maximum dynamic range of the detection unit used (scaling) by the software of the device used;

Feeding the immersion medium into the immersion film region between the front lens and the preparation (auto-immersion);

Recording and detecting the altered intensity of the autofocus signal as back reflection and/or as change of the optical path length between the front lens and the reflecting boundary of the immersion film region and/or recording and detecting the altered intensity and/or sharpness of the reflection from the modulation object; and Changing or stopping the supply of the immersion medium on the basis of the scaling of the intensity of the autofocus signal and/or the path length change of the autofocus signal and/or the intensity of the reflection from the modulation object.

The autofocus signal includes different back reflections which, depending on the boundaries in the beam path, vary between different materials. This variation of intensities is used to differentiate the transition between the different states, such as "no immersion medium available," or "immersion present."

In particular, the difference between the autofocus signal of an air/glass transition and that of an immersion medium/glass transition can be quite substantial due to the considerable difference between the refractive indices of air and the immersion medium. Once the immersion medium is introduced into the gap between the front lens of the microscope objective and the preparation (immersion film region), the back reflection decreases significantly or disappears entirely with the selected scaling. This jump in intensity of the autofocus signal is thus a clear indication that immersion is present, and so the supply is stopped immediately or after a predetermined temporal delay. If no intensity jump occurs within a predetermined interval, it is an indication for an error analysis. For example, this can indicate an electronic or mechanical defect of the immersion system or the supply system. Proceeding from the assumption that there is no technical defect, this also enables detection of a lack of immersion medium.

Due to differences in refractive indices between air and an immersion medium, the focal point of the system objective-dependently shifts by an amount known from optical calculation. The focus of the system is thus adjusted by said known amount with regard to the bottom of the preparation carrier. The algorithm of the autofocus device readjusts this now weak autofocus signal to the maximum dynamic range of the detection unit in order to be able to operate in the immersed state. The intensity difference of the autofocus signal between non-immersed and immersed state can be used for evaluating the immersion process.

The presence of foreign bodies or air bubbles in the immersion film region leads to deviations from the normal form of the autofocus signal and can thus also be detected. Air bubbles or other foreign bodies can be removed by further supplying immersion medium or by a restart of the entire immersion process.

Conversely, in autofocus mode, a compromise of the available immersion can be detected, because in such event, the autofocus signal also disappears or changes significantly since the focal point of the system shifts back by the known amount, thus changing the signal. If the autofocus signal of the bottom of the preparation carrier is checked at the expected point, the autofocus signal, due to the reflection of the air/glass transition, is distinctly stronger than that of the immersion/glass transition. This intensity jump can, once again, be evaluated by means of the automatic illumination control. For that purpose, any limiting values between the exposure times (with and without immersion) can be set as a criterion in the software.

The method according to the invention allows for a detection of the auto-immersion with the available hardware of a correspondingly equipped microscope. With regard to hardware, no further sensors have to be retrofitted since the method can be entirely adjusted to available hardware components in the software.

Since a change of the immersion film region not only changes the intensity of the autofocus signal but also the optical path length between the front lens of the microscope objective and the preparation, it is advantageous if the point in time for a change of the supply of immersion medium to the immersion film region is adjusted on the basis of the changed autofocus signal and/or the changed path length.

Looking at the alternative or supplementary method of reflecting a modulation object image, the change of the path length causes a defocusing of the reflection of the modulation object image and an intensity change of said reflection if it was focused in the state without immersion medium. This information, for example, can be detected by means of the edge gradient of a grid used and additionally or by itself be used for detecting the immersion state. A refocusing of the reflection results once again, as in the method described so far, in an intensity difference of the reflection image.

If the arrangement of a grid image in an intermediate image plane of an incident light beam path is used, a spectral course would be required for the beam splitter in the filter cube of the microscope beam path that preferably has a degree of reflection between 25% and 75% at the wavelength used for illuminating the grid and the sum of transmission and reflection of which is >90%. The intensity of the reflection is subsequently evaluated by means of the microscopic detection, wherein a spatial filtering or Fourier filtering for suppressing veiling glare may also be used post-processing.

BRIEF DESCRIPTION OF THE DRAWINGS

The invention may be more completely understood in consideration of the following detailed description of various embodiments of the invention in connection with the accompanying drawings, in which.

Figure 1:
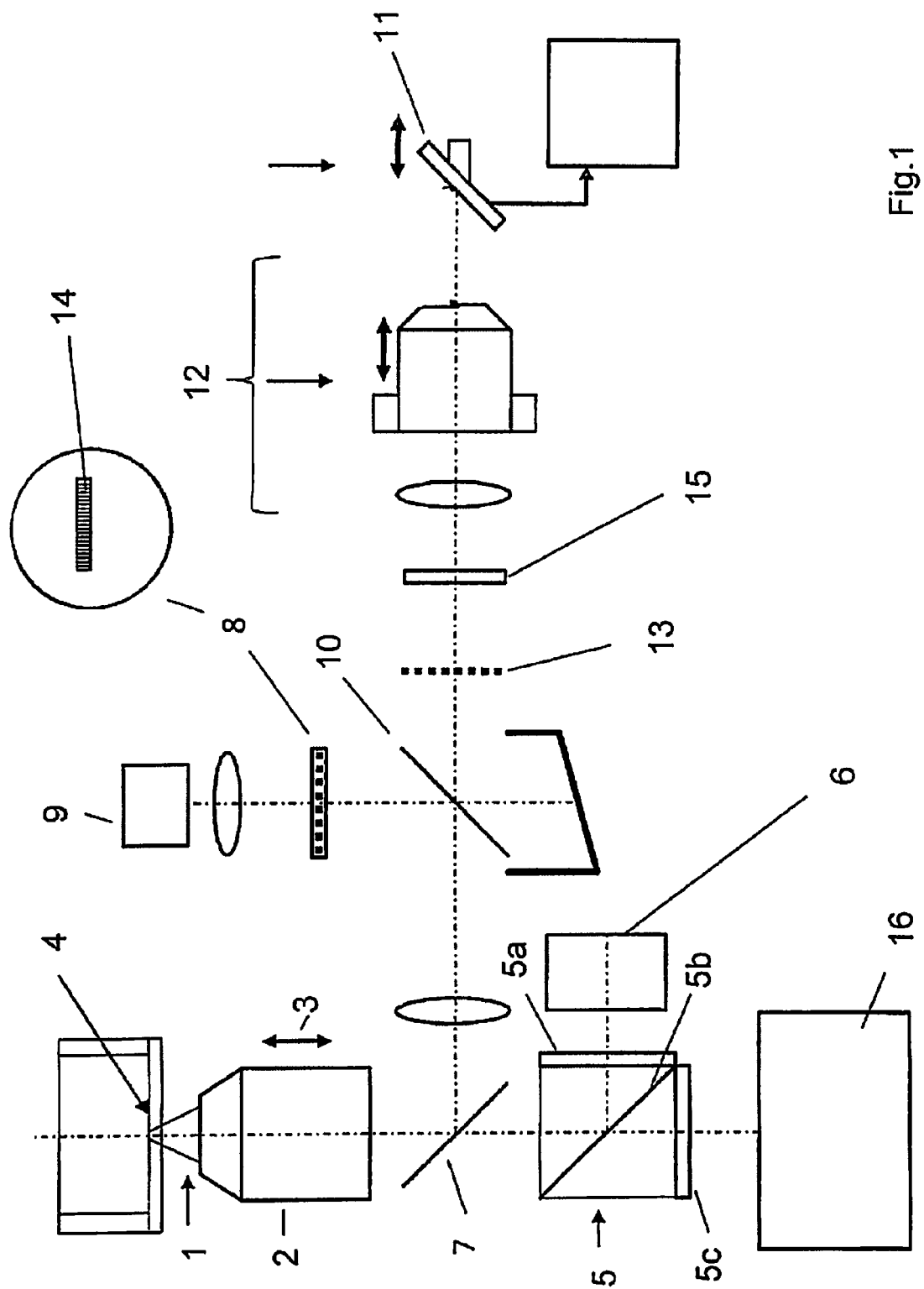
FIG. 1 depicts an autofocus device for microscopy known from WO 2007/144197 A1 suitable for use with the process of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION

FIG. 1 shows a depiction of the autofocus device for microscopy known from PCT application WO 2007/144197 A1 for detecting an immersion medium and controlling its supply into the immersion film region 1 between a microscope objective 2 with a z-drive 3 and a preparation 4, said application being hereby fully incorporated herein by reference.

For a better understanding of the method with an incident light grid image reflection according to the invention, it shall be briefly described as follows. The microscope illumination beam path from an incident light illumination 6, comprising a light source 6a, a modulation object (line grid) 6b, and an incident light tube lens 6c (FIG. 2) is coupled through a beam splitter 5b of a filter cube 5, which can have a dichroic design, wherein the preparation 4 is illuminated with the beam splitter 5b and a dichroic beam splitter 7 through the microscope objective 2. In this application, the filter cube 5, provided with the beam splitter 5b, has additional selection filters in positions 5a and 5c.

The autofocus device has a light modulator (transmission grid) 8 which is illuminated for reflection mode operation by an infrared LED light source 9 (IR LED light source), the spectral centroid of which is above 800 nm. A modulation object generated by the light modulator 8 is projected into the immersion film region 1 or onto the preparation 4 by means of a beam splitter 10 and the beam splitter 7. Since a detection unit 11 (camera) with a z-shifting device and imaging optics 12, including an autofocus objective, also having a z-shifting device, is arranged upstream, an intermediate image 13 of the light modulator 8 is imaged onto the detection unit 11 (camera).

The light modulator 8 which may be a transmission grid is, as slit aperture, may be provided with a stripe grid 14. Furthermore, a band-elimination filter 15 can be arranged upstream of the intermediate image 13 which ensures that only radiation from the appropriate autofocus spectral range reaches the detection unit 11.

According to embodiments of the invention, the state of the immersion film region 1 is recorded and evaluated in a detection unit of the autofocus device with the autofocus signal of the IR LED light source 9 and transmitted to a control unit for the purpose of a change or an error treatment of the immersion process. The following method steps may be performed according to an embodiment of the invention:

1. Focusing automatically without immersion medium between the front lens and a preparation on the bottom of a preparation carrier;
2. Recording the autofocus signal as back reflection from an autofocus device and/or recording the reflection of the modulation object arranged in the intermediate image plane of the incident light illumination using a detection unit;
3. Adjusting the autofocus signal and/or the reflection from the modulation object to the maximum dynamic range of the detection unit using an algorithm performed by a processor of the device used;
4. Feeding the immersion medium into the immersion film region between the front lens of the microscope objective and the preparation (auto-immersion);
5. Recording and detecting the altered intensity of the autofocus signal as back reflection and/or as change of the optical path length between the front lens of the microscope objective and the reflecting boundary of the immersion film region on the bottom of the preparation carrier and/or recording and detecting the altered intensity and/or sharpness of the reflection from the modulation object; and
6. Changing or stopping the supply of the immersion medium based on scaling of the intensity of the autofocus signal and/or the path length change of the autofocus signal and/or the intensity of the reflection from the modulation object.

The light emitted from the IR LED light source 9 is prevented from passing into the microscopic image with a block filter 5c (selection filter) arranged upstream of the detection unit 16.

Figure 2:
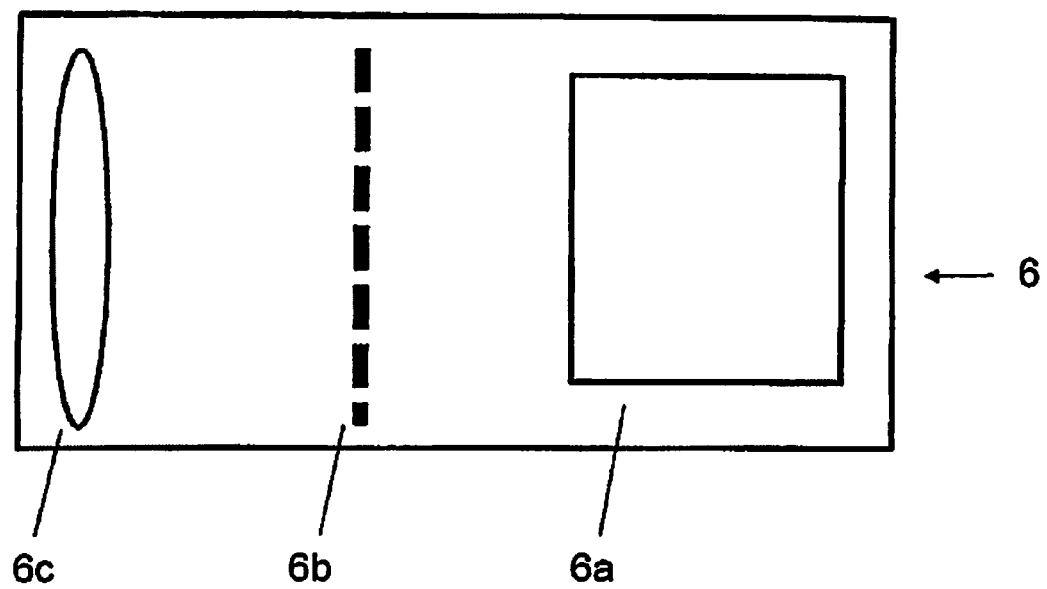
FIG. 2 depicts incident light illumination according to FIG. 1.
Figure 3:
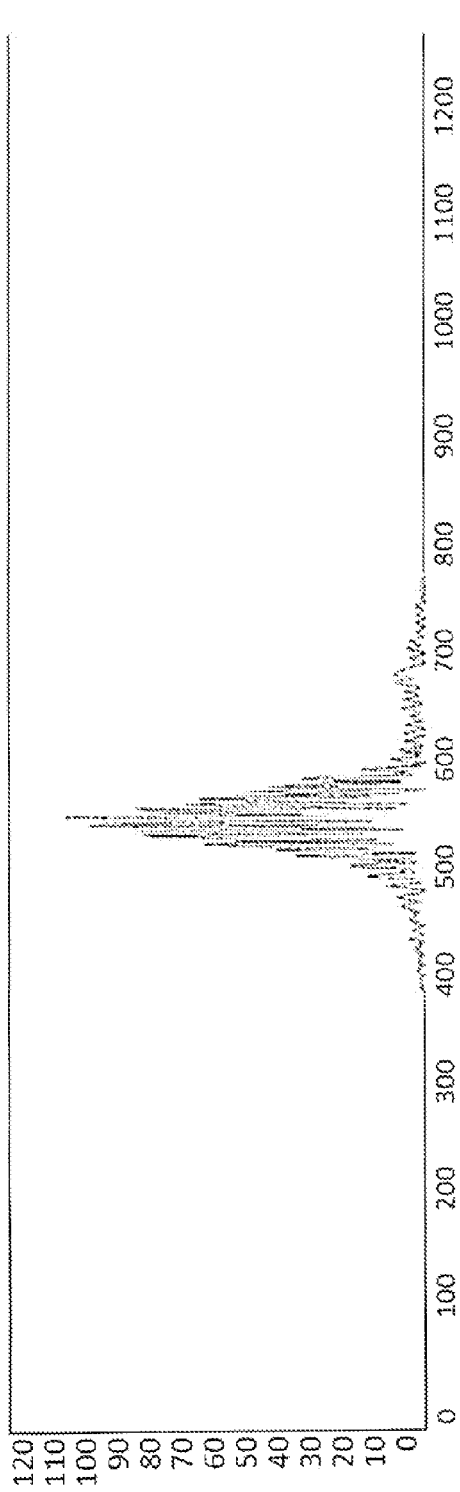
FIG. 3 depicts a high autofocus signal of an air/glass transition.
Figure 4:
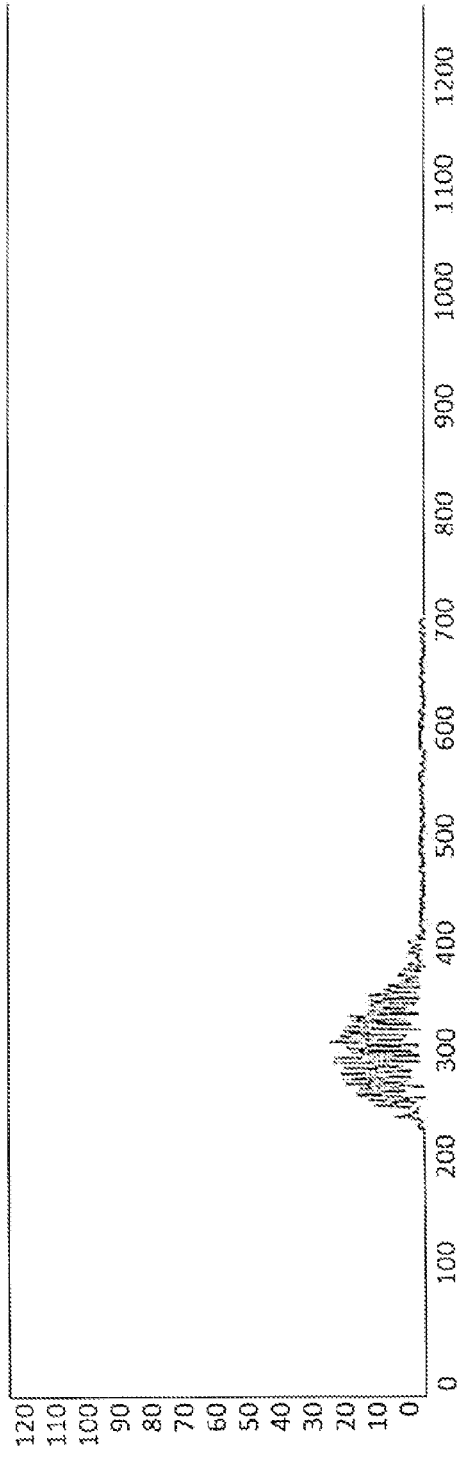
FIG. 4 depicts a low autofocus signal of an immersion medium/glass transition.

FIGS. 3 and 4 depict different back reflections (autofocus signals) which, depending on the boundaries in the immersion film region, vary between different materials, and so the current immersion state is accurately detected. FIG. 2 shows a relatively high autofocus signal from an air/glass transition, while FIG. 3 shows a distinctly lower autofocus signal from an immersion medium/glass transition.

The invention claimed is:

1. A method for detecting and controlling a supply of a liquid immersion medium into an immersion film region disposed between a front lens of a microscope objective of a microscope having an autofocus device and a preparation being examined with the microscope, by using a light source reflected into a microscope beam path of the microscope with a beam splitter, the method comprising recording and evaluating a state of the immersion film region with a detection unit of the microscope or a detection unit of the autofocus device, using an autofocus signal of the light source or a reflection of a modulation object arranged in an intermediate image plane of an incident light illumination source, the method including:

focusing the microscope without the immersion medium between the front lens and the preparation;

recording the autofocus signal as back reflection from the autofocus device or recording the reflection of the modulation object arranged in the intermediate image plane of the incident light illumination using one of the detection units;

supplying immersion medium into the immersion film region;

recording and detecting an altered intensity of the autofocus signal as back reflection or a change of the optical path length between the front lens and a reflecting boundary of the immersion film region, or recording and detecting the altered intensity or sharpness of the reflection from the modulation object in order to determine a state of the immersion film region:

communicating the state of the immersion film region to a control unit; and using the control unit, changing a characteristic of the supply of the immersion medium based on the state of the immersion film region.

2. The method of claim 1, wherein the method includes altering the supply of the immersion medium based on scaling or intensity of the autofocus signal or path length change of the autofocus signal, or intensity of reflection from the modulation object.

3. The method of claim 2, wherein the relative timing of a change of the supply of immersion medium into the immersion film region is adjusted on the basis of the changed autofocus signal, or the changed path length, or the changed reflection from the modulation object.

4. The method of claim 2, wherein an objective-dependent shift of the focal point of the system caused by the difference in refractive indices between air and immersion medium is corrected after the supply of the immersion medium into the immersion film region is stopped.

5. The method of claim 4, wherein software of the autofocus device readjusts the changed autofocus signal from the immersion film region to the maximum dynamic range of the detection unit in order to operate in an immersed state after correcting the focal point.

6. The method of claim 1, wherein deviations from a normal form of the altered intensity of the autofocus signal or altered intensity of reflection from the modulation object are detected in an immersed state.

7. The method of claim 1, including determining limiting values for the autofocus signal or the reflection from the modulation object between exposure times without immersion medium and with immersion medium respectively, in the immersion medium region.

8. The method of claim 1, wherein a line grid is used as the modulation object.

9. The method of claim 1, wherein the beam splitter is used for detecting the intensity of the reflection from the modulation object, using a spectral course having a degree of reflection between 25% and 75% at the wavelength used for illuminating the modulation object, and wherein the sum of transmission and reflection is >90%.

10. The method of claim 1, wherein detection of the autofocus signal or detection of the modulation object is executed using spatial filtering and/or Fourier filtering for suppressing veiling glare.

* * * * *